United States Patent [19]

Check et al.

[11] Patent Number: 4,639,568

[45] Date of Patent: Jan. 27, 1987

[54] APPARATUS AND METHOD FOR FINISHING FUEL INJECTOR SPRAY TIPS USING EDM

[75] Inventors: John M. Check, Chelsea; Myron C. Johnson, Freeland, both of Mich.

[73] Assignee: Ex-Cell-O Corporation, Troy, Mich.

[21] Appl. No.: 630,809

[22] Filed: Jul. 13, 1984

[51] Int. Cl.[4] .................. B23H 7/00; B23H 9/10; B21K 1/24; F02M 55/00

[52] U.S. Cl. .................. 219/69 M; 29/156.7 A; 72/340; 204/129.1; 219/69 E; 219/69 R; 239/533.3

[58] Field of Search .............. 29/157 C, 558, 156.7 A, 29/156.7 R; 76/107 R; 239/533.2, 533.3; 219/69 E, 69 M, 69 R, 68, 69 V; 204/129.1, 129.2, 129.5, 129.7; 72/340, 341

[56] References Cited

U.S. PATENT DOCUMENTS

| | | | |
|---|---|---|---|
| 481,332 | 8/1892 | Powell | 29/156.7 A |
| 1,390,022 | 9/1921 | Coakley | 29/156.7 A |
| 2,406,963 | 9/1946 | Norton | 29/156.7 A |
| 2,797,595 | 7/1957 | Smith et al. | 76/107 R |
| 2,927,737 | 3/1960 | Zeuch et al. | 239/533.3 |
| 3,052,013 | 9/1962 | Kane | 29/558 |
| 3,201,856 | 8/1965 | Keegan et al. | 29/156.7 R |
| 3,240,914 | 3/1966 | Hill et al. | 219/69 M |
| 3,388,232 | 6/1968 | Dreisin | 219/69 M |
| 3,947,940 | 4/1976 | Augustine | 29/157 C |
| 3,980,237 | 9/1976 | Parrish, Jr. | 239/533.3 |
| 4,069,978 | 1/1978 | El Moussa | 219/69 M |
| 4,284,043 | 8/1981 | Happel | 239/533.2 |
| 4,430,784 | 2/1984 | Brooks et al. | 72/340 |
| 4,502,196 | 3/1985 | Kupper et al. | 29/157 C |
| 4,535,519 | 8/1985 | Kajikawa et al. | 29/558 |
| 4,535,939 | 8/1985 | Skinner | 239/533.3 |
| 4,544,820 | 10/1985 | Johnson | 219/69 M |

FOREIGN PATENT DOCUMENTS

| | | | |
|---|---|---|---|
| 206770 | 12/1982 | Japan | 239/533.3 |
| 2438014 | 3/1975 | United Kingdom | 239/533.3 |
| 2032520A | 5/1980 | United Kingdom | 239/533.2 |
| 2097859A | 11/1982 | United Kingdom | 239/533.2 |
| 2099076A | 12/1982 | United Kingdom | 239/533.2 |
| 829388 | 5/1981 | U.S.S.R. | 219/69 M |
| 865576 | 9/1981 | U.S.S.R. | 219/69 M |

OTHER PUBLICATIONS

*Electrical Discharge Machining*, by Jameson, Editor, pp. 128 & 129.
"EDM Speeds Fuel Injector Production", 11/1983.
"EDM Drills Them Small", *Electrical Discharge Machining*, 1st Edition, 11/1983, pp. 130-133.
"EDM-Center", by Geosger, 08/1981, pp. 10-14, of the *EDM Digest*.

Primary Examiner—A. D. Pellinen
Assistant Examiner—Geoffrey S. Evans
Attorney, Agent, or Firm—John C. Evans

[57] ABSTRACT

Apparatus and a method are provided to form the interior of a fuel injector spray tip by use of a cold forming punch to form a V-shaped spray tip interior configured to reduce fuel dribble and thereafter finishing the interior by use of an EDM electrode to form precision valve seat and fuel sack surfaces.

8 Claims, 9 Drawing Figures

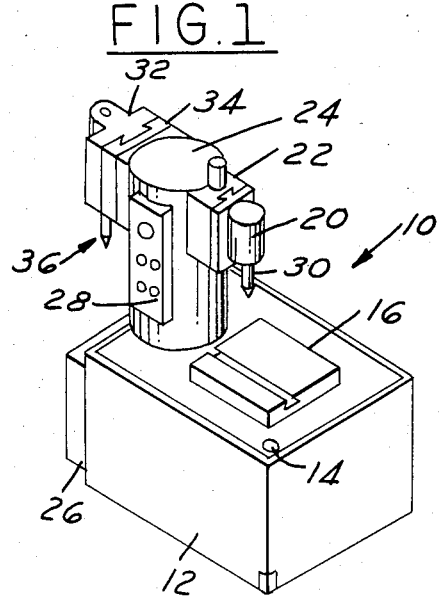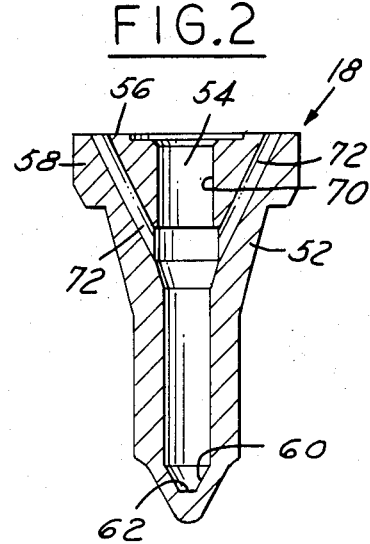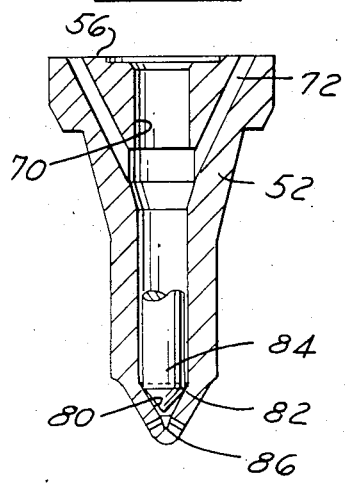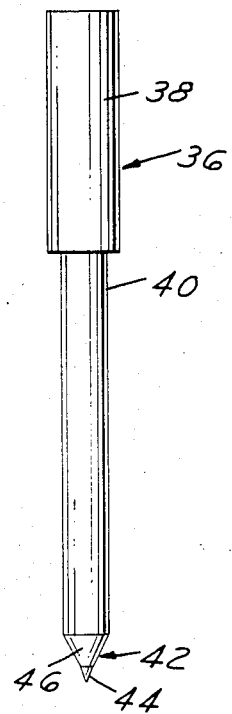

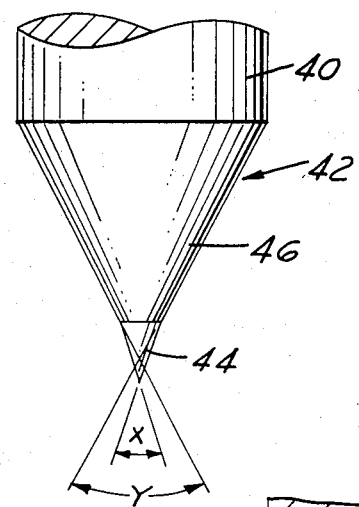
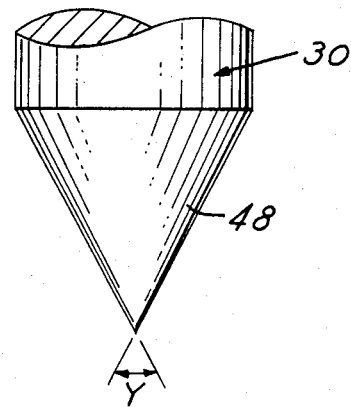
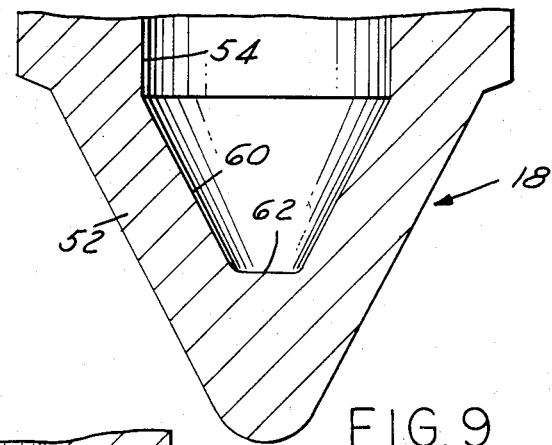
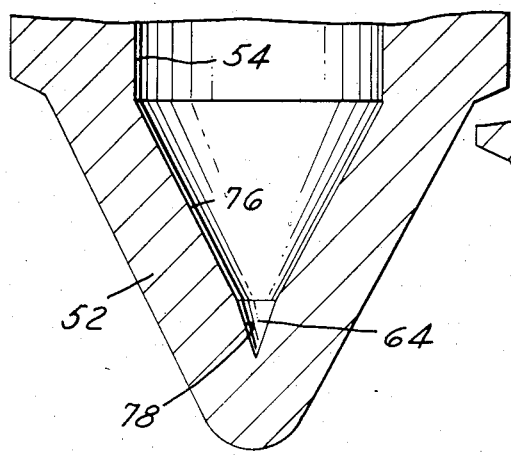
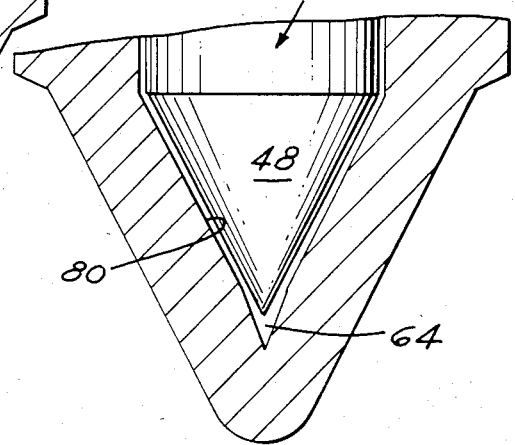

APPARATUS AND METHOD FOR FINISHING FUEL INJECTOR SPRAY TIPS USING EDM

This invention relates to apparatus and a method for finishing fuel injector spray tips and more particularly to apparatus and a method for forming a fuel injector spray tip with a precision valve seat and sackless tip interior.

BACKGROUND OF THE INVENTION

Prior art fuel injectors have a valve guide bore in which a needle valve is reciprocated between open and closed positions with respect to an interior valve seat. The valve seat is spaced from an injector spray tip sack in communication with fuel holes for distributing the fuel. Such injector spray tips have a hemispherically configured sack region formed in the tip downstream of the seat to supply fuel to the spray holes when the needle valve is opened. Once the needle valve is closed, fuel contained in the sack region is no longer under pressure and will dribble from the spray holes during periods when no fuel should enter the combustion chamber. Consequently the combustion process may produce undesirable emissions, especially in diesel combustion processes. Anticipated emission regulations require reduction of such emissions.

SUMMARY OF THE INVENTION

The subject invention provides an improved method and apparatus for precision finishing the interior tip region of an injector spray tip configured to prevent fuel dribble; the apparatus including a cold forming punch with a cone tip having a series of progressive cone angles that produce a near net shaped fuel injector "sackless" tip interior. The apparatus further including means for non-contact metal removal finishing of such cone surfaces. In particular an EDM electrode is insertable into the cold formed interior to form precision surfaces on the tip interior and valve seat which cooperate with a later assembled needle valve to produce a reduced volume "sackless" fuel space between the valve seat and spray holes to control fuel dribble therefrom when the valve is closed.

The method of the present invention includes forming a pre-formed fuel injector blank cold by punch forming interior walls of the blank to form a first V-shaped cone surface therein and thereafter finishing the V-shaped cone surface by non-contact machining to define a minimal tip fuel volume to reduce fuel dribble.

PRIOR ART STATEMENT

Machining methods of U.S. Pat. Nos. 2,377,159 and 3,783,225 disclose use of cone-shaped electrodes to remove material from a work-piece to form a shaped hole in the workpiece. There is no suggestion of apparatus or methods including a combined cold forming and non-contact machining process to form a sackless fuel injector spray tip with a precision formed valve seat.

U.S. Pat. Nos. 3,072,777 and 3,614,371 disclose apparatus for moving a non-contact machining electrode transversely of a workpiece to form an opening therein. The apparatus does not include means for pre-forming a workpiece by the cold forming apparatus and method of the present invention.

BRIEF DESCRIPTION OF THE INVENTION

Other advantages of the present invention will be readily appreciated as the same becomes better understood by reference to the following detailed description when considered in connection with the accompanying drawings wherein:

FIG. 1 is a perspective view of apparatus for cold forming and electrical discharge machining the spray tip of a fuel injector in accordance with the present invention;

FIG. 2 is a sectional view of a fuel injector spray tip blank processed by the invention;

FIG. 3 is a cross-sectional view of a finished fuel injector spray tip formed by the present invention.

FIG. 4 is a side elevational view of a cold forming punch used in the apparatus of FIG. 1;

FIG. 5 is an enlarged side sectional view of the end of the punch shown in FIG. 4.

FIG. 6 is a sectional view of an electrode used to non-contact machine the cold-formed surfaces of the spray tip;

FIGS. 7 through 9 are enlarged, fragmentary cross-sectional views of the shape of the end of the blank in FIG. 2 at each process step.

DESCRIPTION OF PREFERRED EMBODIMENT

As illustrated in FIG. 1, the electrical discharge machining structure 10 includes a base 12 having a dielectric storage tank (not shown) therein into which dielectric fluid may be drained through the opening 14. The work table 16 is positioned on base 12 to receive a workpiece such as a fuel injector spray tip blank 18 in which a tip interior volume is to be formed. A rotary electrode spindle structure 20 is secured to and insulated from the vertical slide structure 22 which is attached to turret 24 secured to the base 12. The electrode feed structure 20 is controlled by a trigger circuit and control circuit which may be included in the electrical box 26 supported on the column 24. An electrical discharge machining power supply 28 is positioned in the column 24.

The base 12, dielectric storage tank and associated dielectric fluid supply structure form no part of the present invention and will not therefore be considered in detail herein. It is only necessary that apparatus be provided to supply a dielectric fluid between electrode 30 in the electrode feed structure and the workpiece 18 when it's positioned on the work table 16.

The turret 24 is indexable on the base 12 and carries a punch feed 32 carried by second vertical slide structure 34 that can be aligned with a center cut bore in the spray tip workpiece 18 and reciprocated to move a cold forming punch 36 into the bore to shape interior surfaces of the workpiece in accordance with the invention.

The punch 36, as best shown in FIG. 4, includes a shank 38 which is removably secured to the punch feed 32. A cylindrical extension 40 is formed on the shank 38. A cone-shaped tip 42 is formed on the end of extension 40. As best seen in FIG. 5, the tip 42 has a sharp point cone surface 44 with an included angle X. The sharp point 44 blends with a truncated cone surface 46 with an included angle Y that is greater than the angle X.

The electrode 30 includes a tip 48 having a cone-shaped surface 50 with an included angle equal to angle Y.

The fuel injector spray tip blank 18, shown in FIGS. 2 and 7, includes a pre-cast housing 52 with a pre-formed bore 54 extending from the face 56 of a locating flange 58 to a blind hole formed by cone-shaped interior tip surface 60 with blunt end surface 62. The surfaces 60 and 62 define a punch engaging surface which is cold-formed and non-contact machined to define a sackless spray tip. The bore 54 includes a needle valve guide surface 70 and a transition section which communicates with fuel supply passages 72 in the spray tip body.

The apparatus and method of the present invention are utilized to shape the pre-formed blank 18 to produce a reduced fuel sack region in the fuel injector spray tip.

To accomplish this purpose, the punch 36 is positioned in axial alignment with the open end of bore 54 of the fixtured workpiece 18. The slide structure 34 moves the punch into the bore 54 to cause the tip 42 to cold form the surfaces 60,62 to produce a V-shaped interior tip volume with a relief space 64.

Following the cold forming of surfaces 60,62 the slide structure 34 retracts the punch 36 from the blank 18. Thereafter the turret is indexed to its EDM workstation and the spindle driven electrode 30 is positioned by the slide structure 22 so that its tip 48 is in a spark gapped relationship with the V-shaped formed surface to finish the surfaces by a non-contact metal removing process.

The process sequence starts with the blank surfaces 60,62 as shown enlarged in FIG. 7. The surfaces 60,62 are cold formed by punch surface 46 to produce the V-shaped cone surface 76 shown in FIG. 8. The cold deforming step produces a sharp angle cone surface 78 which defines the relief space 64 at the tip end of blank 18.

FIG. 9 shows a non-contact machining step wherein the cold formed surfaces are shown in relation to electrode 48 which is operative to form a precise surface 80 that is configured to match with a needle valve to reduce fuel dribble when the valve is closed. The relief space 64 surrounds the sharp tip of the electrode 48 and the electrode 48 is thereby moveable to machine a precise cone frustrum surface 80 without excessive electrode wear or undesirable electrode shorting against the workpiece.

the resultant fuel injector spray tip is thereby configured to have an interior end surface 80 and valve seat 82 for a needle valve tip 84 (shown in dotted lines) to be closely spaced with the surface 80 to displace fuel from the tip under pressure as the needle valve closes and define a reduced volume space 86 with a limited fuel capacity following valve closure. Accordingly, the spray tip in an assembled fuel injector assembly will reduce fuel dribble.

This invention has been described in an illustrative manner, and it is to be understood that the terminology which has been used is intended to be in the nature of words of description rather than of limitation.

Obviously, many modifications and variations of the present invention are possible in light of the above teachings. It is therefore to be understood that other embodiments of apparatus and method may be practiced otherwise than as specifically described herein and yet remain within the scope of the appended claims.

The embodiments of the invention in which an exclusive property or privilege is claimed are defined as follows:

1. In apparatus for forming the interior tip region of a dripless fuel injector spray tip having a pre-formed interior surface; means for cold deforming the pre-formed interior surface to form a V-shaped electrode tip relief space and a pre-shaped frusto-conical near net shape valve seat surface, said V-shaped space having an included angle less than the included angle of said pre-shaped frusto-conical near net shape valve seat surface, and electrode means for non-contact machining the frusto-conical surface to produce a precise valve seat and reduced valve tip volume to control fuel dribble, said electrode means including a tip accommodated by said tip relief space for preventing excessive electrode tip erosion.

2. In the apparatus of claim 1, said cold deforming means including a final operation die punch having a cone-shaped tip with a first included angle and a truncated cone surface with a second included angle greater than the first included angle.

3. In the apparatus of claim 1, said electrode means including an electrode having a cone-shaped tip having a first surface thereon complementary to and closely spaced with respect to the frusto-conical surface during non-contact machining thereof and further including an end tip of sharp V-shape located in said V-shaped relief space and wherein said relief space is sized to minimize interior fuel volume of the tip while separating the electrode from the spray tip at the interior end thereof for preventing excessive electrode tip wear during the non-contact machining operation.

4. In the apparatus of claim 1, said cold deforming means including a punch having a cone-shaped tip with a first included angle and a truncated cone surface with a second included angle greater than the first included angle, and said electrode means including an electrode having a cone-shaped tip having surfaces thereon closely spaced with the cold deformed surface of the spray tip for precisely non-contact removing material from said surface during finishing of said interior surfaces and valve seat and wherein said relief space prevents excessive electrode tip wear.

5. A method for producing a dripless fuel sack volume in a fuel injector spray tip having a bore terminating at a frusto-conical surface with a blunt end surface comprising the steps of: cold deforming the blunt end surface and frusto-conical surface to produce a V-shaped electrode tip relief space and a near net shape valve seat, and thereafter non-contact machining the valve seat by use of a V-shaped electrode having its tip configured to be spaced from the tip at the relief space thereby to form a finished valve tip interior that accommodates a needle valve component while defining a reduced volume fuel cavity to reduce fuel dribble when the valve is closed.

6. In the method of claim 5, providing a first conical tool surface with a first included angle and a second conical tool surface at its tip with a second included angle less than said first included angle; and forcing the conical surface progressively in a single stroke into the blunt end surface for cold deformation thereof.

7. In the method of claim 5, non-contact machining the cold deformed surface by use of a spark gap electrode including a conical surface closely spaced from the cold deformed surface.

8. In the method of claim 5, providing a conical cold forming tool surface with a first included angle and a tip with a second included angle less than the first included angle, cold-deforming the blunt end surface and frusto-conical surface by use of the conical tool surface with a first included angle and the tip with a second included angle less than said first included angle, and the non-contact machining including use of a spark gap electrode having a conical surface closely spaced from the cold deformed valve seat and a tip located in the relief space so as to prevent excessive electrode tip wear during the non-contact machining.

* * * * *